US010785379B2

(12) United States Patent
Nagasaki

(10) Patent No.: US 10,785,379 B2
(45) Date of Patent: Sep. 22, 2020

(54) SERVER SYSTEM, NON-TRANSITORY COMPUTER-READABLE MEDIUM STORING COMPUTER-READABLE INSTRUCTIONS FOR SERVER SYSTEM, AND METHOD PERFORMED BY SERVER SYSTEM

(71) Applicant: Brother Kogyo Kabushiki Kaisha, Nagoya-shi, Aichi-ken (JP)

(72) Inventor: Takeshi Nagasaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/261,809

(22) Filed: Jan. 30, 2019

(65) Prior Publication Data
US 2019/0238711 A1    Aug. 1, 2019

(30) Foreign Application Priority Data
Jan. 31, 2018    (JP) .................................. 2018-015093

(51) Int. Cl.
*G06F 16/95*    (2019.01)
*H04N 1/00*    (2006.01)
(Continued)

(52) U.S. Cl.
CPC ......... *H04N 1/32101* (2013.01); *H04L 67/02* (2013.01); *H04N 1/00244* (2013.01); *H04N 2201/3205* (2013.01)

(58) Field of Classification Search
CPC .. G06Q 30/012; G06Q 30/016; G06F 3/1285; G06F 3/1235; G06F 3/1234;
(Continued)

(56) References Cited

U.S. PATENT DOCUMENTS

2006/0103874 A1* 5/2006 Aoki .................. H04N 1/00244
358/1.15
2016/0292550 A1 10/2016 Kawai
(Continued)

FOREIGN PATENT DOCUMENTS

| JP | 2004-086688 A |   | 3/2004 |
| JP | 2004086688 A | * | 3/2004 |
| JP | 2016-193592 A |   | 11/2016 |

*Primary Examiner* — Chad Dickerson
(74) *Attorney, Agent, or Firm* — Banner & Witcoff, Ltd.

(57) ABSTRACT

A server system may, in a case where identification information for identifying an apparatus is inputted to a first terminal device, receive the identification information from the first terminal device; in a case where the identification information is received from the first terminal device, generate a URL including related information related to the identification information; send a message including the URL to a second terminal device; in a case where a selection instruction of selecting the URL included in the message is inputted to the second terminal device, receive the related information from the second terminal device; and in a case where the related information is received from the second terminal device, send screen information to the second terminal device, the screen information representing a registration screen for registering service information in the server system.

20 Claims, 7 Drawing Sheets

(51) Int. Cl.
*H04N 1/32* (2006.01)
*H04L 29/08* (2006.01)

(58) Field of Classification Search
CPC ...... G06F 3/1204; G06F 3/1229; G06F 3/121;
H04N 1/00244; H04N 1/32101; H04N 2201/3205; H04L 67/02
USPC .............................. 358/1.11–1.18; 399/8–32
See application file for complete search history.

(56) References Cited

U.S. PATENT DOCUMENTS

| | | | |
|---|---|---|---|
| 2017/0249641 A1* | 8/2017 | Ohara | H04L 67/141 |
| 2017/0257441 A1* | 9/2017 | Ohara | H04L 67/142 |
| 2018/0241833 A1* | 8/2018 | Hachiya | G06F 3/1229 |
| 2019/0163881 A1* | 5/2019 | Matsudaira | G06F 16/972 |
| 2019/0238712 A1* | 8/2019 | Nagasaki | H04N 1/00244 |

* cited by examiner

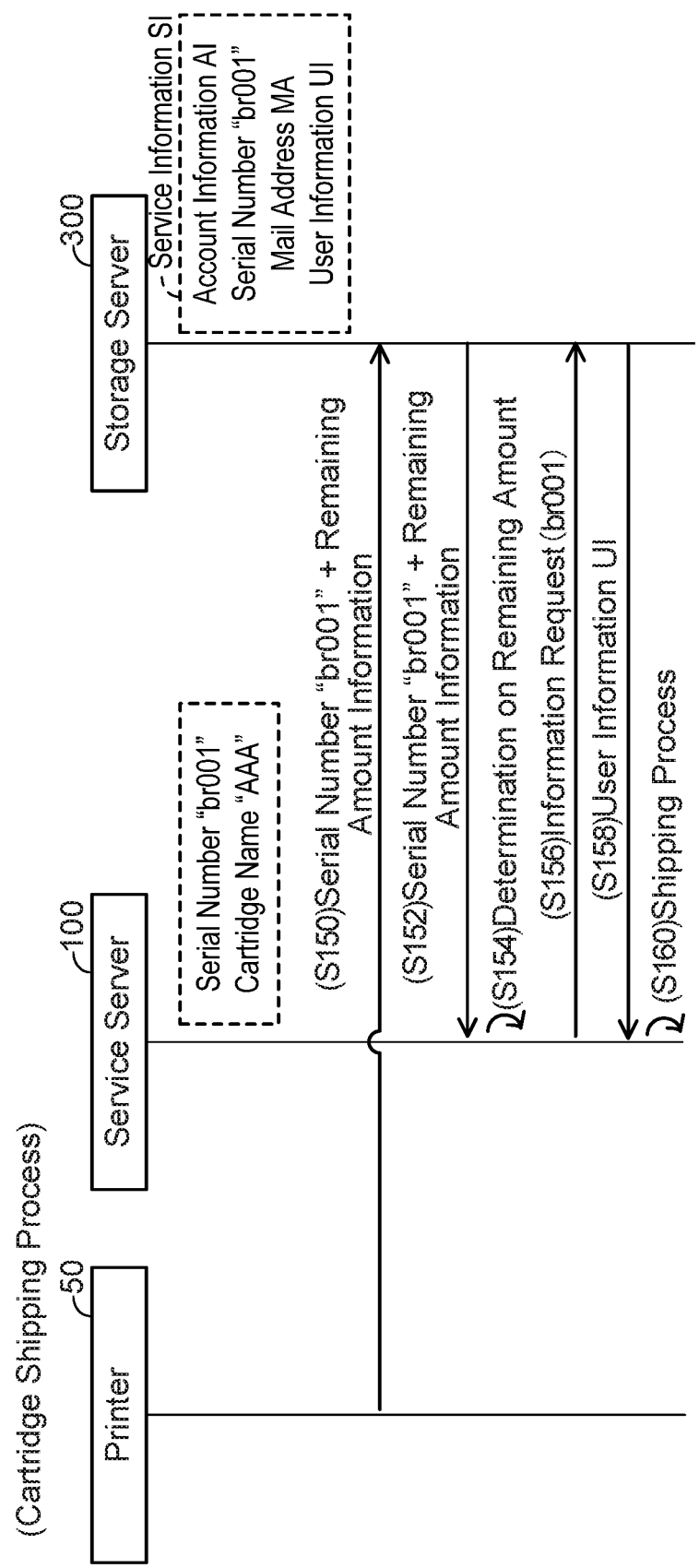

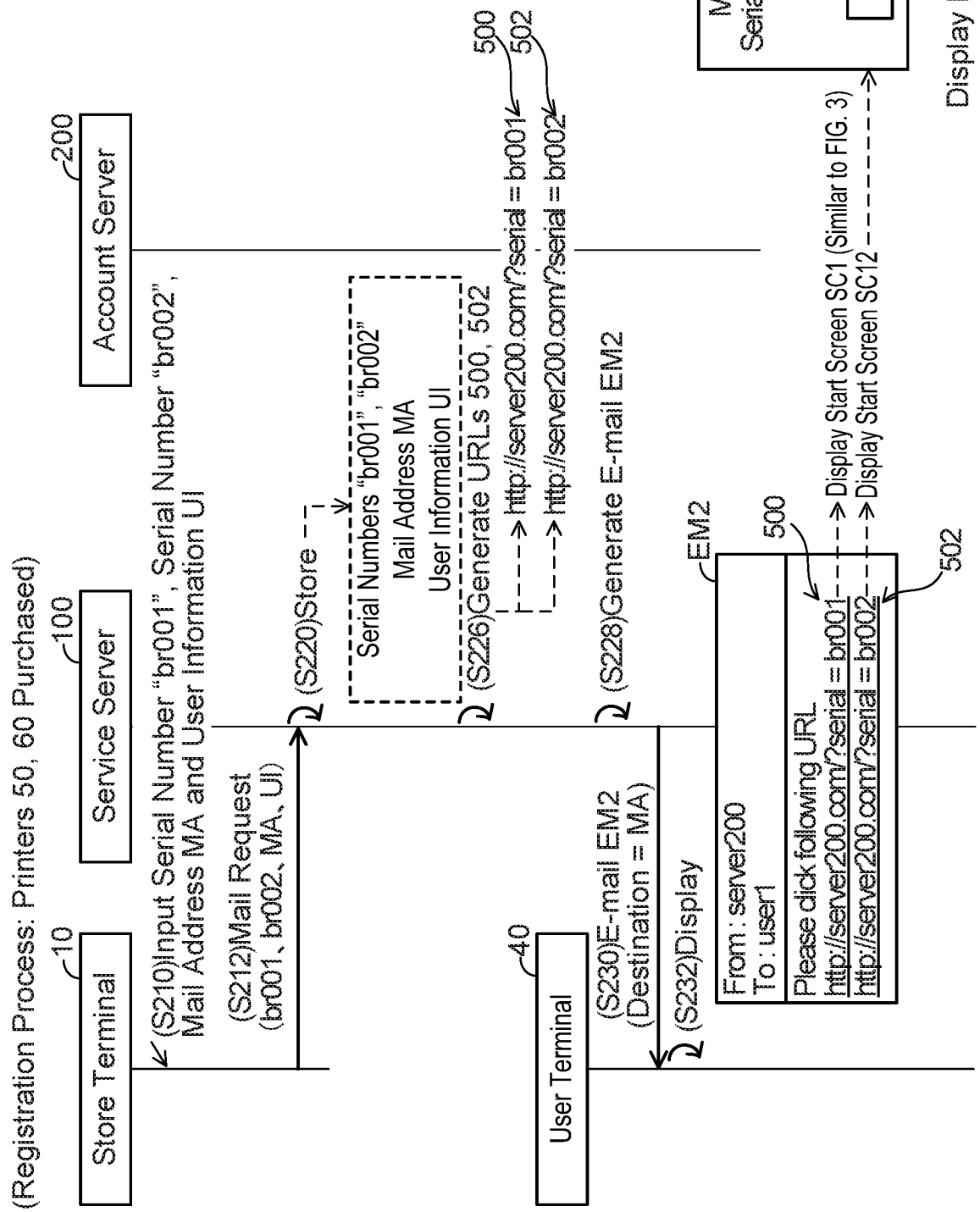

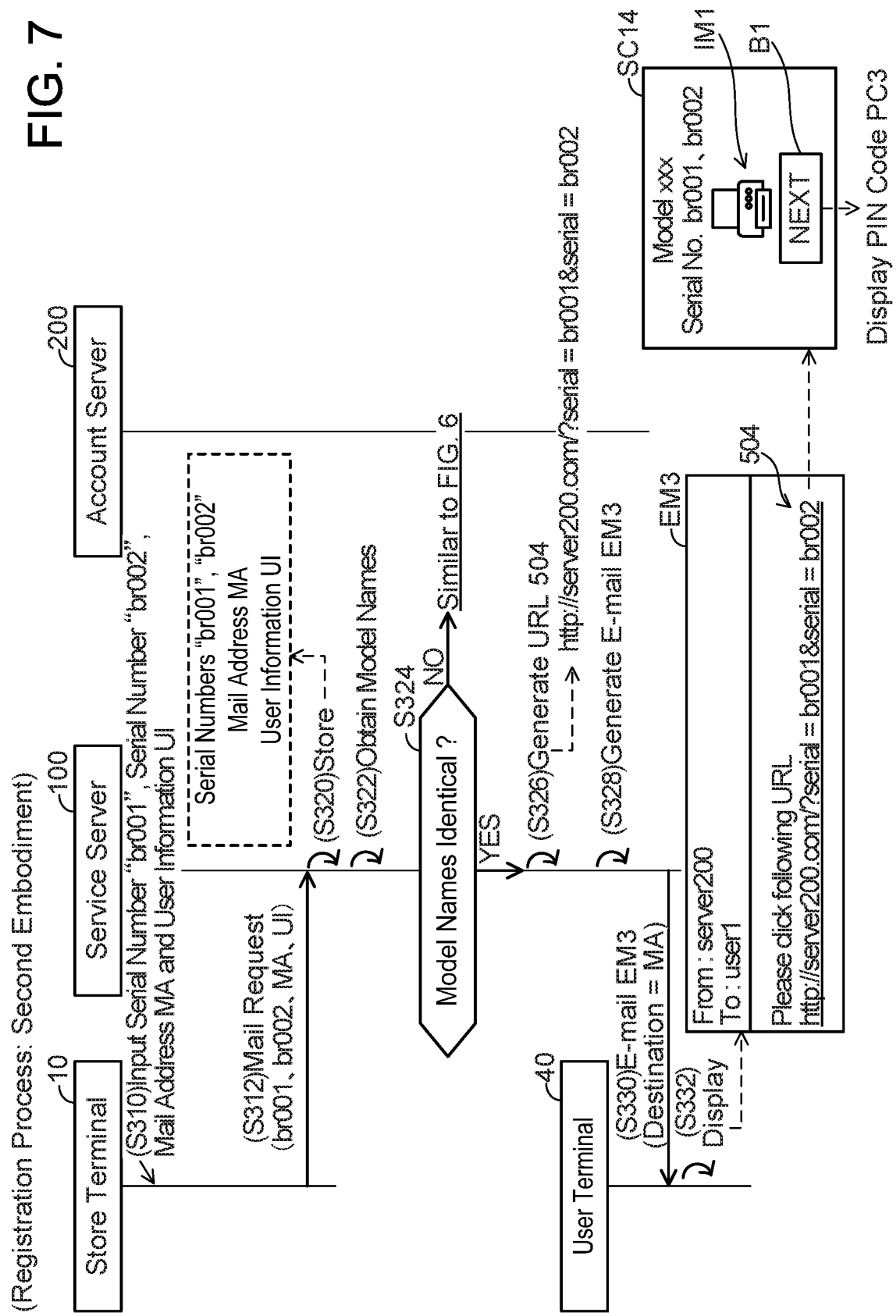

US 10,785,379 B2

SERVER SYSTEM, NON-TRANSITORY COMPUTER-READABLE MEDIUM STORING COMPUTER-READABLE INSTRUCTIONS FOR SERVER SYSTEM, AND METHOD PERFORMED BY SERVER SYSTEM

CROSS-REFERENCE TO RELATED APPLICATION

This application claims priority to Japanese Patent Application No. 2018-015093 filed on Jan. 31, 2018, the contents of which are hereby incorporated by reference into the present application.

TECHNICAL FIELD

The disclosure herein discloses a server system providing a specific service.

DESCRIPTION OF RELATED ART

An information management server is known which provides a shipping service for automatically shipping a new ink cartridge when an ink remaining amount in an ink cartridge mounted in a printer becomes small. In order to receive provision of such a shipping service, a user operates a PC to access a website of the information management server, and obtains a PIN code from the information management server. Then, the user operates the printer to cause the printer to send the PIN code and printer information to the information management server. As a result, the printer information is registered in the information management server, and the information management server provides the shipping service by using the registered printer information.

SUMMARY

In the above technique, in order to access the website of the information management server, the user needs to input a URL of the website to the PC, or needs to search for the website.

The disclosure herein provides a technique for improving user convenience in registering service information in a server system.

A server system disclosed herein may be configured to provide a specific service. The server system may comprise: one or more processors; and one or more memories storing one or more computer-readable instructions therein, the one or more computer-readable instructions, when executed by the one or more processors, causing the server system to: in a case where first identification information for identifying a first apparatus is inputted to a first terminal device, receive the first identification information from the first terminal device; in a case where the first identification information is received from the first terminal device, generate a first Uniform Resource Locator (URL) indicating a location in the server system, the first URL including first related information being related to the first identification information; send a message including the generated first URL to a second terminal device; in a case where a selection instruction of selecting the first URL included in the message displayed on the second terminal device is inputted to the second terminal device, receive the first related information included in the first URL from the second terminal device; and in a case where the first related information is received from the second terminal device, send screen information to the second terminal device, the screen information representing a registration screen being related to a process for registering service information in the server system, the service information including information for a user of the first apparatus identified by the first identification information being related to the first related information to receive provision of the specific service from the server system.

A control method and computer-readable instructions for implementation of the server system described above, and a non-transitory computer-readable recording medium in which the computer-readable instructions are stored, are also novel and useful. A communication system comprising the server system described above and another device (e.g. at least one of the first terminal device, the first apparatus and the second terminal device) is also novel and useful.

BRIEF DESCRIPTION OF THE DRAWINGS

FIG. 5 shows a sequence diagram of a cartridge shipping process;

FIG. 6 shows a sequence diagram of a registration process different from FIG. 2; and FIG. 7 shows a sequence diagram of a registration process of a second embodiment.

EMBODIMENTS

Figure 1:
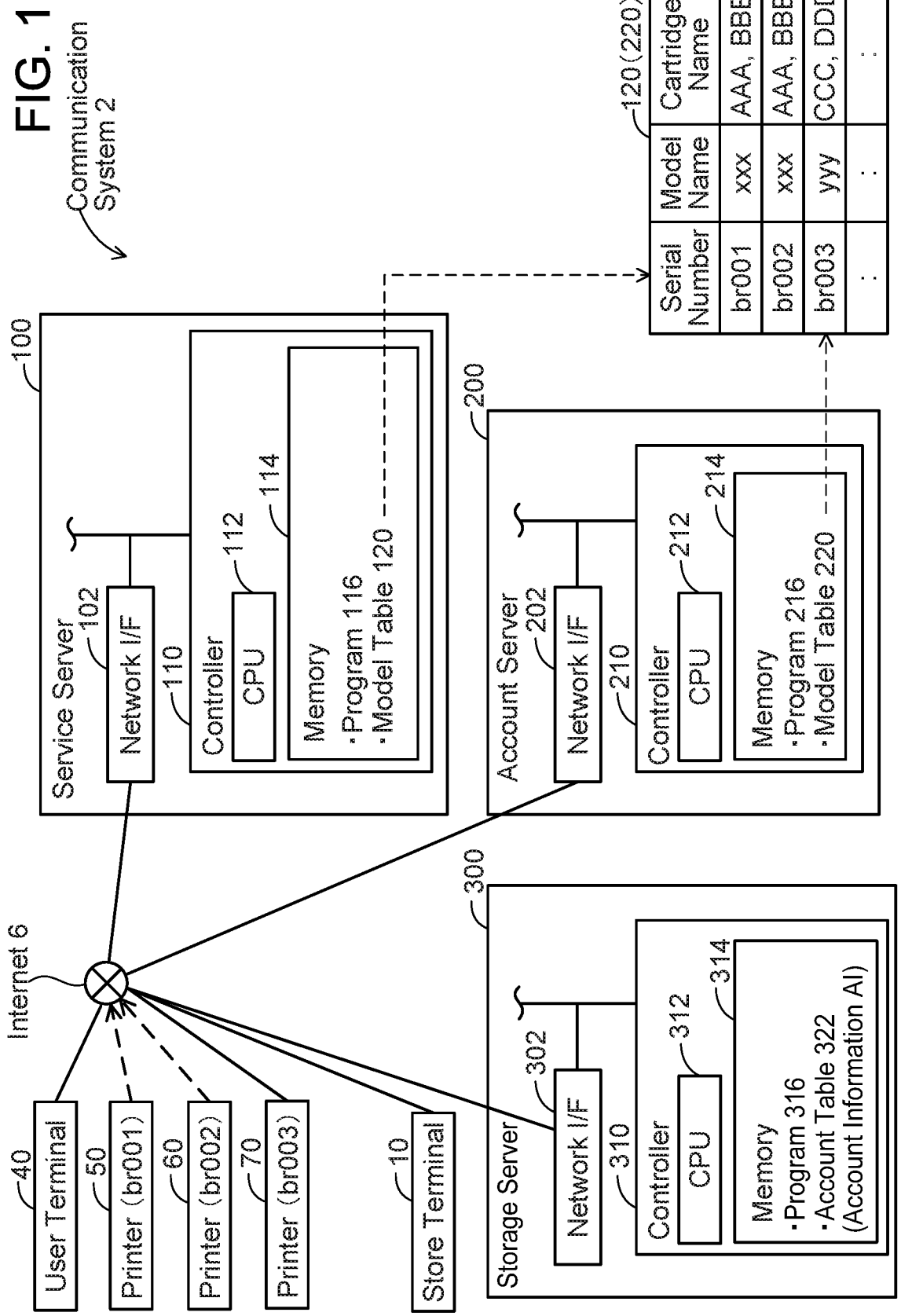
FIG. 1 shows a configuration of a communication system.

First Embodiment (Configuration of Communication System 2; FIG. 1)

As shown in FIG. 1, a communication system 2 comprises a service server 100, an account server 200 configured separately from the service server 100, and a storage server 300 configured separately from the servers 100, 200. The servers 100, 200, 300 are provided on the Internet 6 by a vendor of a printer (e.g., 50), and are capable of executing mutual communication via the Internet 6. The servers 100 to 300 are servers for providing a shipping service of shipping a consumable article (e.g., ink cartridge, toner cartridge, etc.) to be used in a printer (e.g., 50) to a user of that printer. In a variant, at least one of the servers 100 to 300 may be provided by an operator different from the printer vendor.

The communication system 2 further comprises a store terminal 10 and a user terminal 40. The store terminal 10 is a terminal used by an employee of a store selling a printer (e.g., 50). The user terminal 40 is a terminal used by a user of the printer. Each of the terminals 10, 40 is a desktop PC (abbreviation of Personal Computer), a notebook PC, a smartphone, a tablet terminal, etc. The terminals 10, 40 are capable of executing communication with each of the servers 100 to 300 via the Internet 6.

Each of printers 50, 60 is a printer purchased at a specific store provided with the store terminal 10, and is not currently connected with the Internet 6. Upon being connected with the Internet 6, the printers 50, 60 are capable of communicating with each of the servers 100 to 300 via the Internet 6. A printer 70 is a printer purchased at a store other than the specific store, and is currently connected with the Internet 6. The printer 70 is capable of communicating with each of the servers 100 to 300 via the Internet 6. The printers 50, 60, 70 have serial numbers "br001", "br002", "br003", respectively.

(Configurations of Servers 100, 200, 300)

The service server 100 is a server mainly for collecting information related to users receiving provision of a shipping service, and executing a shipping process of a consumable article. The service server 100 comprises a network interface 102 and a controller 110. Hereinbelow, an interface will be denoted as "I/F". The units 102, 110 are connected to a bus line (of which reference number is omitted). The network I/F 102 is connected to the Internet 6. The controller 110 comprises a CPU 112 and a memory 114. The CPU 112 executes various processes in accordance with a program 116 stored in the memory 114. The memory 114 is constituted of a volatile memory, a non-volatile memory, and the like. The memory 114 stores a model table 120.

For each of the one or more printers, the model table 120 stores an association of a serial number (e.g., "br001") for identifying the printer, a model name (e.g., "xxx") assigned to the printer, and a list of ink cartridge names (e.g., "AAA", "BBB") that can be used by the printer.

The account server 200 is a server mainly for issuing accounts to users and for providing various screens for accepting user operations. The account server 200 comprises a network I/F 202 and a controller 210. The units 202, 210 are connected to a bus line (of which reference number is omitted). The network I/F 202 is connected to the Internet 6. The controller 210 comprises a CPU 212 and a memory 214. The CPU 212 executes various processes in accordance with a program 216 stored in the memory 214. The memory 214 is constituted of a volatile memory, a non-volatile memory, and the like. The memory 214 stores a model table 220 which is the same as the model table 120 in the service server 100.

In a case of receiving an instruction for registering account information from, for example, the user terminal 40, the account server 200 generates account information AI and sends the generated account information AI to the user terminal 40. Further, the account server 200 sends the generated account information AI to the storage server 300. Thereby, the account information AI is registered in the storage server 300.

The storage server 300 is a server mainly for registering information related to the shipping service. The storage server 300 comprises a network I/F 302 and a controller 310. The units 302, 310 are connected to a bus line (of which reference number is omitted). The network I/F 302 is connected to the Internet 6. The controller 310 comprises a CPU 312 and a memory 314. The CPU 312 executes various processes in accordance with a program 316 stored in the memory 314. The memory 314 is constituted of a volatile memory, a non-volatile memory, and the like. The memory 314 stores an account table 322.

One or more pieces of account information are registered in the account table 322. Each account information is a combination of an account name indicating a user and a password. As shown in FIG. 1, the account information AI that was issued to the user of the user terminal 40 is registered in the account table 322. Further, service information for the user to receive provision of the shipping service from the servers 100 to 300 can also be registered in the memory 314.

(Processes Executed by Devices 10, Etc.; FIG. 2 to FIG. 6)

Next, processes executed by the devices 10 to 70, 100 to 300 will be described with reference to FIG. 2 to FIG. 6. In the present embodiment, various types of information for providing the shipping service are stored in the service server 100 when a printer is purchased by the user. After the purchase of the printer, service information including the various types of information is registered in the storage server 300 when the user terminal 40 and the printer are operated by the user. The shipping service for a consumable article using the service information is thereby started. Processes to realize this will be described in detail below.

Hereinbelow, for ease of understanding, when processes executed by the CPU 112, etc. of the servers 100 to 300 in accordance with the program 116, etc. are described, the servers will be described as subjects of action, and the CPUs are not described as subjects of action. Further, since all communications described hereinbelow are executed via the Internet 6, the description "via the Internet 6" will be omitted.

Figure 2:
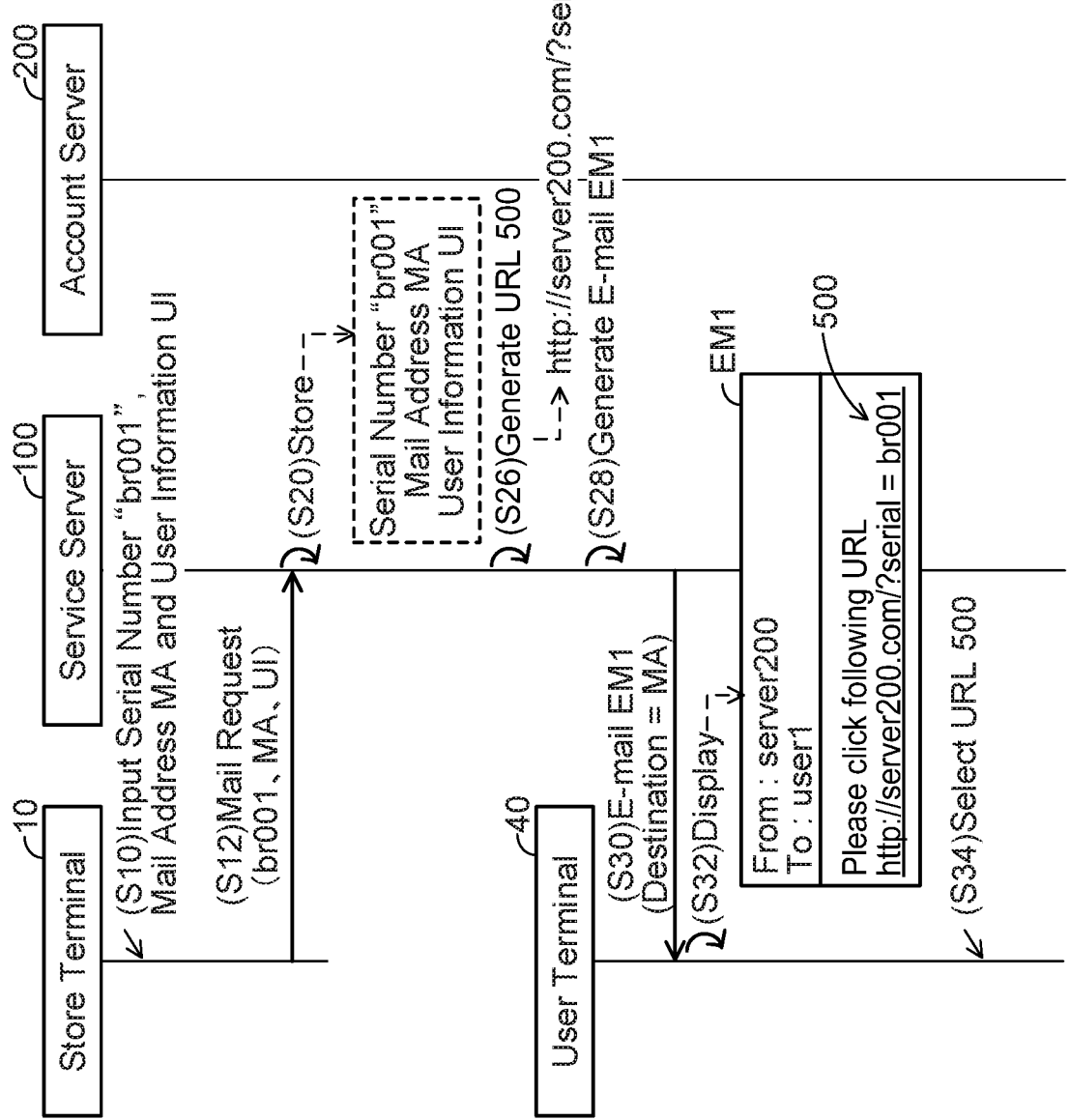
FIG. 2 shows a sequence diagram of a registration process.
Figure 3:
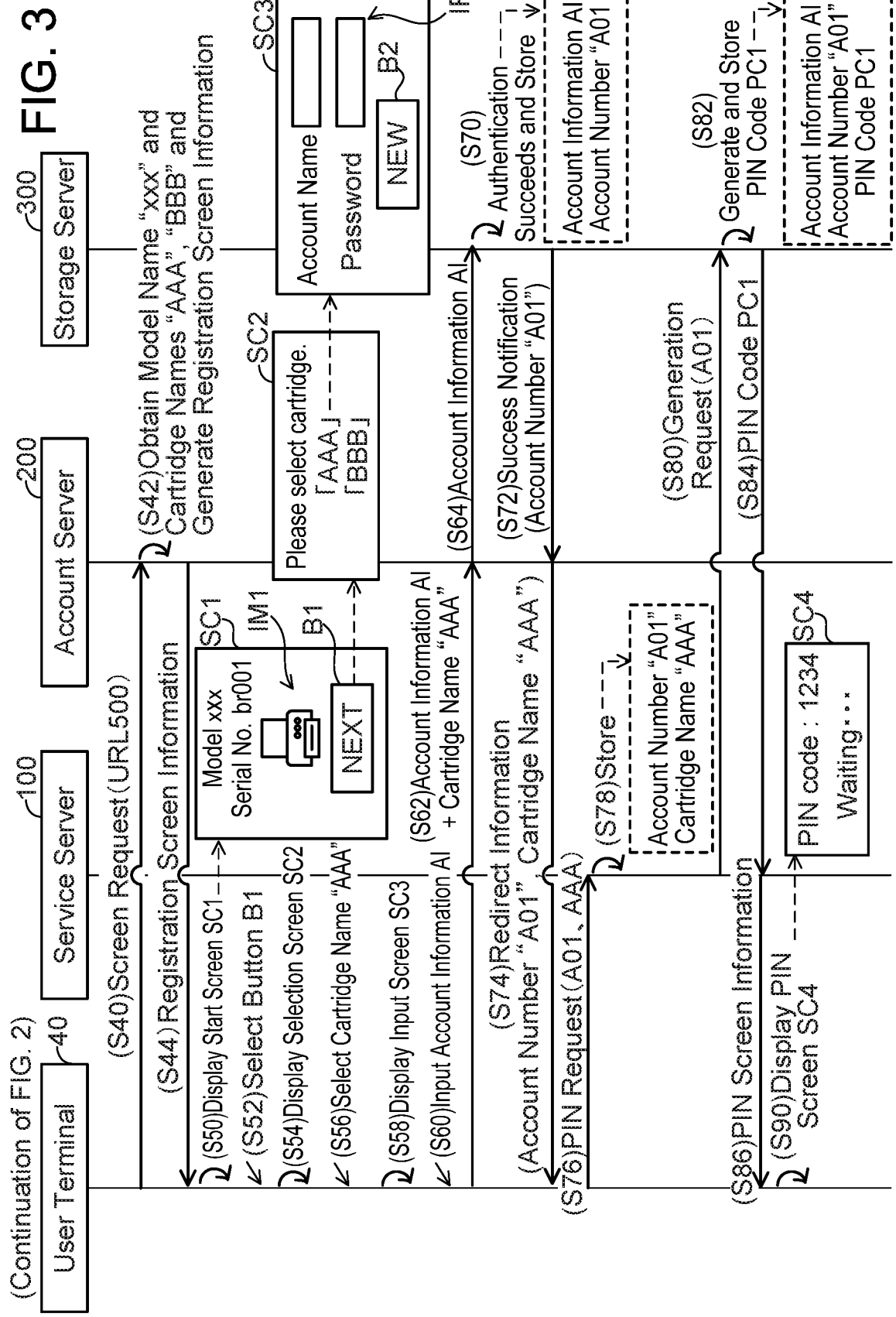
FIG. 3 shows a continuation of the sequence diagram of FIG. 2.
Figure 4:
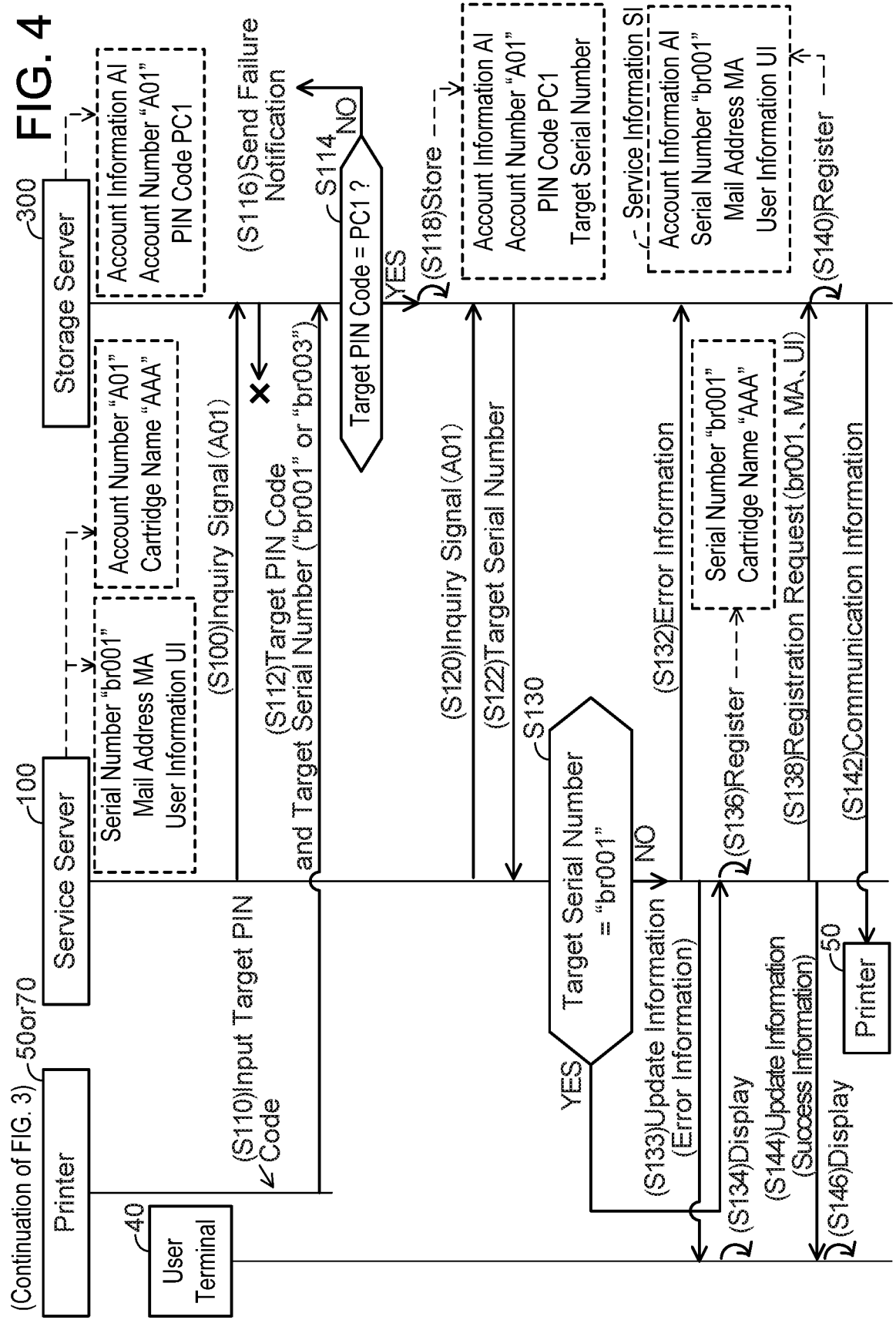
FIG. 4 shows a continuation of the sequence diagram of FIG. 3.

(Registration Process; FIG. 2 to FIG. 4)

A process to register the service information in the storage server 300 will be described with reference to FIG. 2 to FIG. 4. A user purchases one printer 50 at a specific store provided with the store terminal 10.

When the printer 50 is purchased by the user, in S10, the store terminal 10 accepts input of the serial number "br001" for identifying the printer 50, from an employee of the store. Further, the store terminal 10 accepts inputs of an e-mail address MA that can be used by the user and user information UI related to the user, from the employee. The mail address MA is a mail address of the user terminal 40 set in a mailer (not shown) of the user terminal 40. The user information UI includes a name, an address, billing information (e.g., credit card information), etc. of the user.

In S12, the store terminal 10 sends a mail request including the serial number "br001", the mail address MA, and the user information UI, to the service server 100. The mail request is a command for requesting sending of an e-mail including the mail address MA as its destination.

Upon receiving the mail request from the store terminal 10 in S12, the service server 100 stores, in the memory 114, each information (i.e., the serial number "br001", the mail address MA, the user information UI) included in the mail request in S20.

In S26, the service server 100 generates a URL (abbreviation of Uniform Resource Locator) 500 "http://server200.com/?serial=br001". The URL 500 includes a location string "http://server200.com" indicating a location within the account server 200 (e.g., a specific area in the memory 214), and a query string "?serial=br001" indicating a query. The query string includes the serial number "br001" stored in S20.

In S28, the service server 100 generates an e-mail EM1 which includes the mail address MA stored in S20 as the destination and includes a text in which the URL 500 generated in S26 is written. In S30, the service server 100 sends the e-mail EM1. Thereby, the e-mail EM1 is sent to the user terminal 40 via a mail server (not shown).

Upon receiving the e-mail EM1 from the service server 100 in S30, the user terminal 40 (i.e., the mailer (not shown)) displays the e-mail EM1 in S32. In S34, the user terminal 40 accepts a selection instruction of selecting the URL 500 in the e-mail EM1 from the user.

The process continues to be described with reference to FIG. 3. In S40, the user terminal 40 (i.e., a browser (not shown)) sends a screen request including the URL 500 as its destination, to the account server 200. The screen request is a command for requesting a registration screen that accepts an operation for registering the service information.

Upon receiving the screen request from the user terminal 40 in S40, the account server 200 obtains the serial number "br001" from the query string "?serial=br001" in the URL 500, and then obtains the model name "xxx" and the cartridge names "AAA", "BBB" associated with the serial number "br001" from the model table 220 in the memory 214, in S42. Further, in S42, the account server 200 generates registration screen information that represents a registration screen by using the model name "xxx" and the cartridge names "AAA", "BBB". The registration screen includes a start screen SC1, a selection screen SC2, and an input screen SC3.

The start screen SC1 is a screen indicating that an operation for registering the service information starts. The start screen SC1 includes the model name "xxx", the serial number "br001", a printer image IM1, and a button B1 for causing the selection screen SC2 to be displayed. The printer image IM1 is a photo image of the printer having the model name "xxx" obtained in S42.

The selection screen SC2 is a screen for selecting a cartridge name of an ink cartridge to be shipped by the shipping service. The selection screen SC2 includes the cartridge names "AAA", "BBB" obtained in S42. The input screen SC3 includes an input field IF for inputting the account information AI and a generation button B2. If account information that can be used by the user is not registered in the account table 322, the user selects the generation button B2. Thereby, an instruction for registering account information is sent to the account server 200, and account information that can be used by the user is newly registered in the account table 322.

In S44, the account server 200 sends the generated registration screen information to the user terminal 40.

Upon receiving the registration screen information from the account server 200 in S44, the user terminal 40 displays the start screen SC1 in S50. By viewing the model name "xxx" and the printer image IM1 in the start screen SC1, the user can learn the printer 50 for which the operation for registering the service information is to be executed.

When the button B1 in the start screen SC1 is selected in S52, the user terminal 40 displays the selection screen SC2 in S54. By viewing the cartridge names "AAA", "BBB" in the selection screen SC2, the user can learn the cartridge names "AAA", "BBB" that can be used in the printer 50.

The user selects, from among the cartridge names "AAA", "BBB", the cartridge name "AAA" indicating a cartridge which the user wishes to use in the purchased printer 50. When the cartridge name "AAA" in the selection screen SC2 is selected in S56, the user terminal 40 displays the input screen SC3 in S58. When the account information AI is inputted to the input field IF in the input screen SC3 in S60, the user terminal 40 sends the cartridge name "AAA" selected in the selection screen SC2 and the account information AI inputted in the input screen SC3, to the account server 200 in S62.

Upon receiving the cartridge name "AAA" and the account information AI in S62, the account server 200 sends the account information AI to the storage server 300 in S64.

Upon receiving the account information AI from the account server 200 in S64, the storage server 300 succeeds in authentication of the account information AI in S70. In this case, the storage server 300 generates an account number "A01" which is a unique number, and stores the account number "A01" in association with the account information AI in the account table 322. In S72, the storage server 300 sends a success notification indicating that authentication of the account information AI succeeded, to the account server 200. The success notification includes the account number "A01".

Upon receiving the success notification from the storage server 300 in S72, the account server 200 sends redirect information to the user terminal 40 in S74. The redirect information is information for causing the user terminal 40 to send a PIN (abbreviation of Personal Identification Number) request (to be described later) to the service server 100. The redirect information includes the account number "A01" included in the success notification and the cartridge name "AAA" received in S62.

Upon receiving the redirect information from the account server 200 in S74, the user terminal 40 sends a PIN request to the service server 100 in S76. The PIN request is a command for requesting the service server 100 to send a PIN code. The PIN code is used when the service information is registered in the storage server 300. The PIN request includes the account number "A01" included in the redirect information and the cartridge name "AAA" included in the redirect information.

Upon receiving the PIN request from the user terminal 40 in S76, the service server 100 stores the account number "A01" and the cartridge name "AAA" included in the PIN request in association with one another in the memory 114 in S78. In S80, the service server 100 sends, to the storage server 300, a generation request for requesting the storage server 300 to generate a PIN code. The generation request includes the account number "A01" stored in S78.

Upon receiving the generation request from the service server 100 in S80, the storage server 300 generates a PIN code PC1 which is a unique string, in S82. Then the storage server 300 stores the generated PIN code PC1 in the memory 314 in association with the account number "A01" stored in S70. Thereby, the account information AI, the account number "A01", and the PIN code PC1 are associated with one another in the memory 314. In S84, the storage server 300 sends the PIN code PC1 to the service server 100.

Upon receiving the PIN code PC1 from the storage server 300 in S84, the service server 100 sends, to the user terminal 40, PIN screen information representing a PIN screen SC4 that includes the received PIN code PC1, in S86. That is, in S84 and S86, the PIN code PC1 is sent from the storage server 300 to the user terminal 40 via the service server 100.

Upon receiving the PIN screen information from the service server 100 in S86, the user terminal 40 displays the PIN screen SC4 in S90. The PIN screen SC4 includes a character string indicating the PIN code PC1 and a character string "Waiting" indicating that the process for registering the service information is being executed.

The process continues to be described with reference to FIG. 4. After viewing the PIN screen SC4, the user operates a printer (e.g., 50) to input a PIN code (e.g., PC1) to the printer. Hereafter, the printer operated by the user will be described as "target printer", and the PIN code inputted to the target printer will be described as "target PIN code". Since the serial number "br001" of the printer 50 was sent to the service server 100 in S12 of FIG. 2, the service information for providing the shipping service for the printer 50 is supposed to be registered. For this purpose, the user is supposed to operate the printer 50 as the target printer to input the target PIN code to the printer 50. However, it is possible that the user wrongly operates the printer 70, which is different from the printer 50, as the target printer, and wrongly inputs the target PIN code to the printer 70. In the present embodiment, the service information is not registered in the storage server 300 in a case where such a wrong operation is performed since the process described below is executed.

Upon accepting input of the target PIN code from the user in S110, the target printer sends the target PIN code and a target serial number (e.g., "br001") for identifying the target printer, to the storage server 300 in S112.

Upon receiving the target PIN code and the target serial number from the target printer in S112, the storage server 300 determines whether the target PIN code and the PIN code PC1 in the memory 314 are identical in S114. For example, in a case where the user wrongly inputted a PIN code different from the PIN code PC1 to the target printer, or in a case where a third party different from the user inputted a PIN code different from the PIN code PC1 to the target printer, the storage server 300 determines that the target PIN code and the PIN code PC1 are not identical (NO in S114), and sends the target printer a failure notification indicating that authentication of the PIN code failed. In this case, service information is not registered in the storage server 30. Further, for example, in a case where the user inputted the PIN code PC1 to the target printer, the storage server 300 determines that the target PIN code and the PIN code PC1 are identical (YES in S114), and proceeds to S118. As such, since authentication of the PIN code PC1 is executed, the service information can be registered in response to an instruction from an appropriate user.

In S118, the storage server 300 stores the target serial number in association with the PIN code PC1 in the memory 314. Thereby, the account information AI, the account number "A01", the PIN code PC1, and the target serial number are associated with one another in the memory 314.

Here, the service server 100 repeatedly sends an inquiry signal to the storage server 300 (S100 and S120 of FIG. 4), with reception of the PIN code PC1 from the storage server 300 as a trigger (S84 of FIG. 3). The inquiry signal is a signal for inquiring whether the storage server 300 has received the target serial number and the target PIN code from the target printer. The inquiry signal includes the account number "A01".

In a case of receiving the inquiry signal before the target serial number and the target PIN code are received from the target printer (in a case of S100), the storage server 300 does not send the service server 100 a response to the inquiry signal since the target serial number is not associated with the account number "A01" included in the inquiry signal in the memory 314. Further, in a case of receiving the inquiry signal after the target serial number and the target PIN code have been received from the target printer (in a case of S120), the storage server 300 obtains the target serial number associated with the account number "A01" from the memory 314, and sends the target serial number to the service server 100 in S122.

Here, a comparative example is assumed in which repetitive sending of the inquiry signal is started at a predetermined timing before the PIN code PC1 is sent to the service server 100 in S84 of FIG. 3. The predetermined timing is, for example, the timing of sending the e-mail EM1 in S30 of FIG. 2. In this case, during a period from the sending of the e-mail EM1 until the sending of the PIN code PC1, the inquiry signal is sent repeatedly despite the storage server 300 not receiving the PIN code PC1, and thus a communication load is high. In contrast, as in the present embodiment, the service server 100 starts repeatedly sending the inquiry signal with the reception of the PIN code PC1 from the storage server 300 as the trigger (S100). Therefore, the communication load between the servers 100, 300 can be reduced compared to the comparative example.

Upon receiving the target serial number from the storage server 300 in S122, the service server 100 determines whether the target serial number and the serial number "br001" in the memory 114 are identical in S130. For example, in the case where the user wrongly inputted the target PIN code to the printer 70, not to the printer 50, the service server 100 determines that the target serial number, which is the serial number "br003" of the printer 70, and the serial number "br001" in the memory 114 are not identical (NO in S130), and sends error information to the storage server 300 in S132. The error information indicates that the target PIN code was inputted to the wrong printer 70. In this case, the storage server 300 deletes the target serial number in the memory 314. Thus, the service information is not registered in the storage server 30.

Further, in the case of determining NO in S130, the service server 100 sends in S133, to the user terminal 40, update information for updating the PIN screen SC4 displayed in S90 of FIG. 3. The update information includes the error information.

Upon receiving the update information from the service server 100 in S133, the user terminal 40 updates the PIN screen SC4 by using the error information in the update information in S134. Specifically, instead of the character string "Waiting" in the PIN screen SC4, a character string "Error" indicating that the target PIN code was inputted to the wrong printer is displayed. Thereby, the user can learn that the target PIN code was inputted to the wrong printer.

Further, for example, in a case where the user has correctly inputted the target PIN code to the printer 50, the service server 100 determines that the target serial number, which is the serial number "br001" of the printer 50, and the serial number "br001" in the memory 114 are identical (YES in S130), and proceeds to S136.

In S136, the service server 100 registers the serial number "br001" and the cartridge name "AAA" (i.e., the cartridge name "AAA" stored in S78 of FIG. 3) in association with one another in the memory 114.

In S138, the service server 100 sends the storage server 300 a registration request for requesting the storage server 300 to register the service information. The registration request includes each information stored in the memory 114 in S20 of FIG. 2 (i.e., the serial number "br001", the mail address MA, the user information UI).

Upon receiving the registration request from the service server 100 in S138, the storage server 300 registers service information SI in the memory 314 in S140. Specifically, by using the serial number "br001" included in the registration request, the storage server 300 obtains the account information AI stored in association with the serial number "br001" (see S118) from the memory 314. Then, the storage server 300 registers, in the memory 314, the service information SI including the obtained account information AI and each information included in the registration request (i.e., the serial number "br001", the mail address MA, the user information UI). In S142, the storage server 300 sends, to the printer 50, communication information for executing communication with the storage server 300. The communication information is, for example, an access token generated by the storage server 300.

Further, in the case of determining YES in S130, the service server 100 sends update information including success information to the user terminal 40 in S144. The success information indicates that the target PIN code was inputted to the correct printer 50 and that registration of the service information SI succeeded.

Upon receiving the update information from the service server 100 in S144, the user terminal 40 updates the PIN screen SC4 by using the success information in the update information in S146. Specifically, a character string "Success" indicating that the registration of the service information SI succeeded is displayed in the PIN screen SC4, instead of the character string "Waiting". Thereby, the user can learn that the registration of the service information SI succeeded. When S146 ends, the registration process ends.

(Cartridge Shipping Process; FIG. 5)

Next, a process executed for shipping an ink cartridge to the user after the registration process of FIG. 2 to FIG. 4 will be described with reference to FIG. 5.

In S150, the printer 50 uses the communication information received in S142 of FIG. 4 to send, to the storage server 300, the serial number "br001" of the printer 50 and remaining amount information that indicates a remaining amount of an ink cartridge currently being used by the printer 50. The printer 50 may execute the communication of S150 on a regular basis, or may execute the communication of S150 when the remaining amount of the ink cartridge has become less than a threshold.

In case of receiving the serial number "br001" and the remaining amount information from the printer 50 in S150, the storage server 300 sends the serial number "br001" and the remaining amount information to the service server 100 in S152.

Upon receiving the serial number "br001" and the remaining amount information from the storage server 300 in S152, the service server 100 determines in S154 whether the remaining amount indicated by the remaining amount information is equal to or less than a predetermined value. In a case of determining that the remaining amount is greater than the predetermined value, the service server 100 does not execute processes thereafter. On the other hand, in case of determining that the remaining amount is equal to or less than the predetermined value, the service server 100 sends, to the storage server 300, an information request for requesting the user information in the service information SI in S156. The information request includes the serial number "br001".

Upon receiving the information request from the service server 100 in S156, the storage server 300 obtains the service information SI including the serial number "br001" from the memory 314, and sends the user information UI included in the obtained service information SI to the service server 100 in S158.

Upon receiving the user information UI from the storage server 300 in S158, the service server 100 obtains the cartridge name "AAA" associated with the serial number "br001" from the memory 114 and executes a shipping process for shipping the ink cartridge indicated by the cartridge name "AAA" in S160. Specifically, the service server 100 makes payment for the purchase of the ink cartridge indicated by the cartridge name "AAA" by using the billing information (e.g., the credit card information) included in the user information UI. Then, the service server 100 designates the name and address of the user included in the user information UI, and arranges shipping of the ink cartridge. Thereby, an employee of a shipping agent ships the ink cartridge. When S160 ends, the cartridge shipping process ends.

(Registration Process Different From FIG. 2; FIG. 6)

Unlike the case of FIG. 2, the user purchases the two printers 50, 60. S210 is the same as S10 of FIG. 2 except for accepting input of the serial numbers "br001", "br002" of the two printers 50, 60. S212 is the same as S12 of FIG. 2 except for the two serial numbers "br001", "br002" being sent. Thereby, in S220, the service server 100 stores each information included in the mail request (the serial number "br001", the serial number "br002", the mail address MA, the user information UI) in the memory 114.

In S226, the service server 100 generates the URL 500 and a URL 502 "http://server200.com/?serial=br002". The URL 502 is the same as the URL 500 except for including the serial number "br002". In S228, the service server 100 generates one e-mail EM2 including a text in which the URL 500 and the URL 502 are written. In S230, the service server 100 sends the generated e-mail EM2 to the user terminal 40.

S232 is the same as S32 of FIG. 2 except for displaying the e-mail EM2. The process executed in the case where the URL 500 in the e-mail EM2 is selected is the same as that of FIG. 3, FIG. 4. On the other hand, a process executed in a case where the URL 502 in the e-mail EM2 is selected is the same as that of FIG. 3, FIG. 4 except for a start screen SC12 including the serial number "br002" being displayed, and a PIN code PC2 different from the PIN code PC1 being generated.

For example, a comparative example is assumed in which, instead of S228, one e-mail including a text in which the URL 500 is written and another e-mail including a text in which the URL 502 is written are sent. In this case, the user has to view the two e-mails in the user terminal 40. In contrast, in the present embodiment, the user simply needs to view the single e-mail EM2 including the two URLs 500, 502 (S232), and therefore user convenience is improved compared to the comparative example.

(Effects of Present Embodiment)

According to the above configuration, in the case of receiving the serial number "br001" for identifying the printer 50 from the store terminal 10 (S12 of FIG. 2), the service server 100 generates the URL 500 including the serial number "br001" (S26) and sends the e-mail EM1 including the URL 500 to the user terminal 40 (S30). Then, in the case where the URL 500 in the e-mail EM1 is selected by the user (S34), the account server 200 sends the registration screen information to the user terminal 40 (S44 of FIG. 3). Thereby, the screens SC1 to SC3 for registering the service information are displayed on the user terminal 40. As a result, the user can register the service information SI in the storage server 300 by using the screens SC1 to SC3, even without inputting a URL for accessing the account server 200 or searching for the URL. As such, user convenience for registering the service information SI in the storage server 300 can be improved.

Further, for example, a comparative example is assumed in which the process of S130 of FIG. 4 is not executed. In this case, when the PIN code PC1 is inputted to the printer 70, the authentication of the PIN code PC1 succeeds, as a result of which the storage server 300 can register service information including a serial number "br003" of the printer 70. In this case, the service server 100 comes to provide the shipping service for the printer 70 that is not a target of the shipping service. In contrast, according to the configuration of the present embodiment, the service server 100 receives the serial number "br001" from the store terminal 10 and stores the serial number "br001" in the memory 114 (S12, S20). Then, in the case where the target serial number and the serial number "br001" in the memory 114 are identical (YES in S130 of FIG. 4) due to the PIN code PC1 having been inputted to the printer 50, the storage server 300 registers the service information SI that includes information (e.g., the user information UI) for the user of the printer 50 to receive provision of the shipping service (S140). On the other hand, in the case where the target serial number and the serial number "br001" in the memory 114 are not identical (NO in S130 of FIG. 4) due to the PIN code PC1 having been inputted to the printer 70, the storage server 300 does not register the service information SI (S132, S133). As such, the service server 100 can provide the shipping service for the appropriate printer 50.

(Correspondence Relationships)

The shipping service and the servers 100 to 300 are examples of "specific service" and "server system", respectively. The printer 50, the serial number "br001", the printer 60, and the serial number "br002" are examples of "first apparatus", "first identification information", "second apparatus", and "second identification information", respectively. The service server 100 and the account server 200 are examples of "first server" and "second server", respectively. The store terminal 10 and the user terminal 40 are examples of "first terminal device" and "second terminal device", respectively. The URL 500 and the URL 502 are examples of "first URL" and "second URL", respectively. The serial number "br001" and the e-mail EM1 (or EM2) are examples of "first related information" and "message". The screens SC1 to SC3 of FIG. 3 and the registration screen information of S44 are examples of "registration screen" and "screen information", respectively. The model table 120 is an example of "table". The model name "xxx", and the model name "xxx" and the printer image IM1 in the start screen SC1 of FIG. 3 are examples of "first model information" and "image representing the model", respectively. The mail address MA is an example of "destination information". The remaining amount information of FIG. 5 and the shipping process of S160 are examples of "status information" and "service process", respectively.

S12, S26, and S30 of FIG. 2 are examples of "receiving the first identification information from the first terminal device", "generating first URL", and "sending the message", respectively. S40 and S44 of FIG. 3 are examples of "receiving the first related information from the second terminal device" and "sending screen information to the second terminal device", respectively.

Second Embodiment

The present embodiment is different from the first embodiment mainly in the process of the service server 100 generating a URL. The user purchases the two printers 50, 60. S310 to S320 are the same as S210 to S220 of FIG. 6. In S322, the service server 100 obtains, from the model table 120 in the memory 114, the model name "xxx" associated with the serial number "br001" and the model name "xxx" associated with the serial number "br002".

In S324, the service server 100 determines whether the two model names obtained in S322 are identical. In the case of FIG. 7, since the model name "xxx" associated with the serial number "br001" and the model name "xxx" associated with the serial number "br002" are identical, the service server 100 determines YES in S324 and proceeds to S326. On the other hand, for example, in a case where the models of the two printers 50, 60 are different, the two model names obtained in S322 are not identical, and therefore the service server 100 determines NO in S324 and executes the same process as S226 to S232 of FIG. 6.

In S326, the service server 100 generates one URL 504 "http://server200.com/?serial=br001&serial=br002". The URL 504 is the same as the URL 500 except for including a query string "?serial=br001&serial=br002". The query string of the URL 504 includes the serial number "br001" and the serial number "br002". In S328, the service server 100 generates an e-mail EM3 including the URL 504. In S330, the service server 100 sends the generated e-mail EM3 to the user terminal 40.

S332 is the same as S32 of FIG. 2 except for displaying the e-mail EM3. The user terminal 40 accepts, from the user, a selection instruction of selecting the URL 504 in the e-mail EM3. In this case, the user terminal 40 sends, to the account server 200, a screen request including the URL 504 as its destination (see S40 of FIG. 3). Thereby, the user terminal 40 receives registration screen information from the account server 200 and displays a start screen SC14 (see S50 of FIG. 3). The start screen SC14 is the same as the start screen SC1 of FIG. 3 except for including the serial number "br001" and the serial number "br002". In a case where the button B1 in the start screen SC14 is selected, the selection screen SC2 is displayed. The subsequent processes are the same as S54 to S90 of FIG. 3 except for a PIN code PC3, which is different from the PIN code PC1, being generated and displayed. The PIN code PC3 is inputted to the printer 50 and to the printer 60 (see S110 of FIG. 4). As a result, the service server 100 registers the serial number "br001", the serial number "br002", and the cartridge name "AAA" in association with one another in the memory 114 (see S136 of FIG. 4), and the storage server 300 registers the service information SI including both the serial number "br001" and the serial number "br002" in the memory 314 (see S140).

According to such a configuration, the user can register the service information SI for the printers 50, 60 by selecting the one URL 504 in the e-mail EM3 and inputting the same PIN code PC3 to the two printers 50, 60. Therefore, user convenience can be improved.

Further, as described above, in the case of determining that the two model names obtained in S322 are identical (YES in S324), the service server 100 generates the one URL 504 (S326) and sends the e-mail EM3 including the URL 504 (S330). Then, after selecting the URL 504 in the e-mail EM3, the user can use the selection screen SC2 to appropriately select one ink cartridge (i.e., the cartridge name "AAA") that can be used in the two printers 50, 60 having the same model "xxx". On the other hand, in the case of determining that the two model names obtained in S322 are not identical (NO in S324), the service server 100 generates the two URLs 500, 502 corresponding to the two printers and sends the e-mail EM2 including the two URLs 500, 502 (S230 of FIG. 6). After selecting the URL 500, the user can select an appropriate ink cartridge that can be used in the printer corresponding to the URL 500, and further, after selecting the URL 502, the user can select an appropriate ink cartridge that can be used in the printer corresponding to the URL 502. Therefore, the user can receive provision of the shipping service for the ink cartridge corresponding to the model of the printer.

The technique of the present embodiment can also be adopted to a case where three or more printers are purchased and three or more serial numbers are inputted. For example, in a case where three model names of three printers are all identical, one URL including the three serial numbers is generated. Further, for example, in a case where two model names among the three model names of the three printers are identical, one URL including two serial numbers corresponding to the two model names and one URL including a serial number corresponding to the model name other than the two model names may be generated. The serial number "br002" and the model name "xxx" are examples of "second related information" and "second model information", respectively. The URL 504 is an example of "one first URL".

(Variant 1) The communication system 2 may comprise one server, instead of the servers 100 to 300. In this case, the processes of FIG. 2 to FIG. 7 may be executed by the one server. One server executes various processes in the present variant, whereas the three servers execute various processes in each of the embodiments above. Therefore, each of the embodiments above can reduce a processing load compared to the present variant. In the present variant, the one server is an example of "server system".

(Variant 2) In each of the above embodiments, the URL 500 includes the serial number "br001". Instead, the URL 500 may include an encrypted serial number. In this case, the account server 200 may decrypt the encrypted serial number included in the screen request of S40 of FIG. 3 to obtain the serial number "br001". Further, the URL 500 may include predetermined information (e.g., a sequence number) stored in association with the serial number "br001" in the service server 100. In this case, the account server 200 may obtain the serial number "br001" from the service server 100 by using the predetermined information included in the screen request of S40 of FIG. 3. Further, the URL 500 may include an area character string (e.g., "area1") indicating a specific area in the server in which the serial number "br001" is stored. In this case, the URL 500 may not include the query string, and may be, for example, "http://server200.com/area1". In the present variant, the encrypted serial number, the predetermined information, and the area character string are examples of "first related information".

(Variant 3) In each of the above embodiments, the service server 100 sends an e-mail (S30 of FIG. 2). Instead, the service server 100 may send an SMS (abbreviation of Short Message Service) message, or may send an SNS (Social Networking Service) message. In this case, the service server 100 may receive a telephone number, or an SNS account name from the store terminal 10 as the destination of the message. In the present variant, the SMS message and the SNS message are examples of "message", and the telephone number and the SNS account name are examples of "destination information".

(Variant 4) In each of the above embodiments, the model table 120 stores a model name Instead, the model table 120 may store a part of a model name (e.g., a character string representing one model group). In the present variant, the part of the model name is an example of "model information".

(Variant 5) In S42 of FIG. 3, the process of obtaining the model name may not be executed. According to the present variant, "obtaining first model information" can be omitted.

(Variant 6) The service server 100 may not store the model table 120. According to the present variant, "server system" may not comprise a memory storing "table".

(Variant 7) In each of the above embodiments, in the case where the serial number "br001" and the mail address MA are inputted to the store terminal 10, the service server 100 receives the mail address MA from the store terminal 10. Instead, the mail address MA may be stored in the service server 100 before the serial number "br001" is inputted to the store terminal 10. According to the present variation, "destination information" may not be received from the first terminal device together with the first identification information.

(Variant 8) The process of S324 of FIG. 7 may not be executed. The service server 100 may generate one URL even in the case where the two obtained model names are different from one another. In the present variant, "obtaining second model information" can be omitted.

(Variant 9) In the second embodiment described above, in the case where the two model names are not identical (S324 of FIG. 7), the service server 100 sends the one e-mail EM2 including the two URLs 500, 502 to the user terminal 40 (S230 of FIG. 6). Instead, the service server 100 may send, to the user terminal 40, one e-mail including the URL 500 and another e-mail including the URL 502. In the present variant, the one e-mail and the other e-mail are examples of "message".

(Variant 10) In the above embodiments, information related to the printer 50 is registered in the service server 100 and the storage server 300, and the shipping service for the consumable article to the user of the printer 50 is executed from the service server 100. Instead, each of the servers 100, 300 may be a server provided by a vendor of a terminal device such as a PC, a smartphone, etc. In this case, each of the servers 100, 300 may register information related to the terminal device, and upon receiving a serial number from the terminal device in S150 of FIG. 5, may execute an information providing service of providing a user with the information related to the terminal device (e.g., information regarding new model, etc.). In the present variant, the terminal device and the information providing service are examples of "first apparatus" and "specific service" respectively, and "receiving status information from the first apparatus" and "executing a service process" can be omitted.

(Variant 11) In each of the above embodiments, the processes of FIG. 2 to FIG. 7 are realized by the CPU 112, etc. of the server 100, etc. executing the program 116, etc. (i.e., software). Instead, any of the processes may be realized by hardware such as a logic circuit.

What is claimed is:

1. A server system configured to provide a specific service, the server system comprising:
   one or more processors; and
   one or more memories storing one or more computer-readable instructions therein, the one or more computer-readable instructions, when executed by the one or more processors, causing the server system to:
      in a case where first identification information and destination information are inputted to a first terminal device, receive the inputted first identification information and the inputted destination information from the first terminal device, the first identification information identifying a first apparatus, and the destination information indicating a destination of a message to a user of a second terminal device which is different from the first terminal device;
      in a case where the first identification information and the destination information are received from the first terminal device, generate a first Uniform Resource Locator (URL) indicating a location in the server system, the first URL including first related information related to the first identification information;
      send the message including the generated first URL to the second terminal device based on the destination information;
      in a case where a selection instruction of selecting the first URL included in the message displayed on the second terminal device is inputted to the second terminal device, receive the first related information included in the first URL from the second terminal device; and in a case where the first related information is received from the second terminal device, send screen information to the second terminal device, the screen information representing a registration screen related to a process for registering service information in the server system, and the service information including information for a user of the first apparatus, identified by the first identification information related to the first related information, to receive provision of the specific service from the server system.

2. The server system as in claim 1, wherein the one or more computer-readable instructions, when executed by the one or more processors, further cause the server system to:

in the case where the first related information is received from the second terminal device, obtain first model information related to a model of the first apparatus based on the first identification information related to the first related information; and generate the screen information representing the registration screen including an image representing the model of the first apparatus based on the obtained first model information.

3. The server system as in claim 2, wherein the one or more memories store a table in which, for each of one or more apparatuses, identification information is associated with model information related to a model of an apparatus, and the first model information associated with the first identification information in the table in the one or more memories is obtained.

4. The server system as in claim 1, wherein the first related information is identical to the first identification information.

5. The server system as in claim 1, comprising:

a first server comprising a first processor among the one or more processors and a first memory among the one or more memories, the first memory storing first computer-readable instructions among the one or more computer-readable instructions; and a second server configured separately from the first server, the second server comprising a second processor among the one or more processors and a second memory among the one or more memories, the second memory storing second computer-readable instructions among the one or more computer-readable instructions, wherein the first computer-readable instructions, when executed by the first processor, cause the first server to:
receive the first identification information and the destination information from the first terminal device;
generate the first URL; and
send the message to the second terminal device, and wherein the second computer-readable instructions, when executed by the second processor, cause the second server to:
receive the first related information from the second terminal device; and
send the screen information to the second terminal device.

6. The server system as in claim 1, wherein the one or more computer-readable instructions, when executed by the one or more processors, further cause the server system to:

in a case where the first identification information for identifying the first apparatus and second identification information for identifying a second apparatus different from the first apparatus are inputted to the first terminal device, receive the second identification information from the first terminal device, wherein in a case where the first identification information and the second identification information are received from the first terminal device, the first URL, including the first related information related to the first identification information and a second URL are generated, the second URL indicating a location in the server system and including second related information related to the second identification information, and the message is one message including the first URL and the second URL.

7. The server system as in claim 1, wherein the one or more computer-readable instructions, when executed by the one or more processors, further cause the server system to:

in a case where the first identification information for identifying the first apparatus and second identification information for identifying a second apparatus different from the first apparatus are inputted to the first terminal device, receive the second identification information from the first terminal device, wherein in a case where the first identification information and the second identification information are received from the first terminal device, one URL is generated as the first URL, the one URL including the first related information related to the first identification information and second related information related to the second identification information, and the message includes the one URL, which is the first URL, including the first related information and the second related information.

8. The server system as in claim 7, wherein the one or more computer-readable instructions, when executed by the one or more processors, further cause the server system to:

in a case where the first identification information and the second identification information are received from the first terminal device,
obtain first model information related to a model of the first apparatus based on the first identification information; and
obtain second model information related to a model of the second apparatus based on the second identification information, wherein in a case where the first model information is identical to the second model information,
the one URL is generated as the first URL, the one URL including the first related information and the second related information; and
the message includes the one URL, which is the first URL, including the first related information and the second related information, wherein in a case where the first model information is not identical to the second model information, the first URL including the first related information and not including the second related information is generated, wherein the one or more computer-readable instructions, when executed by the one or more processors, further cause the server system to:
in the case where the first model information is not identical to the second model information, generate a second URL indicating a location in the server system and including the second related information related to the second identification information, and wherein in the case where the first model information is not identical to the second model information, the message includes the first URL and the second URL.

9. The server system as in claim 1, wherein the one or more computer-readable instructions, when executed by the one or more processors, further cause the server system to:
receive, from the first apparatus, status information that indicates a usage status of a consumable article currently being used in the first apparatus after the service information has been registered in the server system; and
execute, based on the received status information, a service process for providing the specific service of shipping a consumable article for use in the first apparatus.

10. A non-transitory computer-readable medium storing one or more computer-readable instructions for a server system, the one or more computer-readable instructions, when executed by one or more processors of the server system, causing the server system to:
in a case where first identification information and destination information are inputted to a first terminal device, receive the inputted first identification information and the inputted destination information from the first terminal device, the first identification information identifying a first apparatus, and the destination information indicating a destination of a message to a user of a second terminal device which is different from the first terminal device;
in a case where the first identification information and the destination information are received from the first terminal device, generate a first Uniform Resource Locator (URL) indicating a location in the server system, the first URL including first related information related to the first identification information;
send the message including the generated first URL to the second terminal device based on the destination information;
in a case where a selection instruction of selecting the first URL included in the message displayed on the second terminal device is inputted to the second terminal device, receive the first related information included in the first URL from the second terminal device; and
in a case where the first related information is received from the second terminal device, send screen information to the second terminal device, the screen information representing a registration screen related to a process for registering service information in the server system, the service information including information for a user of the first apparatus identified by the first identification information related to the first related information to receive provision of a specific service from the server system.

11. The non-transitory computer-readable medium as in claim 10, wherein the one or more computer-readable instructions, when executed by the one or more processors, further cause the server system to:
in a case where the first related information is received from the second terminal device, obtain first model information related to a model of the first apparatus based on the first identification information related to the first related information; and
generate the screen information representing the registration screen including an image representing the model of the first apparatus based on the obtained first model information.

12. The non-transitory computer-readable medium as in claim 11, wherein
the server system comprises one or more memories storing a table in which, for each of one or more apparatuses, identification information is associated with model information related to a model of an apparatus, and
the first model information associated with the first identification information in the table in the one or more memories is obtained.

13. The non-transitory computer-readable medium as in claim 10, wherein
the first related information is identical to the first identification information.

14. The non-transitory computer-readable medium as in claim 10, wherein the one or more computer-readable instructions, when executed by the one or more processors, further cause the server system to:
in a case where the first identification information for identifying the first apparatus and second identification information for identifying a second apparatus different from the first apparatus are inputted to the first terminal device, receive the second identification information from the first terminal device,
wherein in a case where the first identification information and the second identification information are received from the first terminal device, the first URL, including the first related information related to the first identification information and a second URL are generated, the second URL indicating a location in the server system and including second related information related to the second identification information, and
the message is one message including the first URL and the second URL.

15. The non-transitory computer-readable medium as in claim 10, wherein the one or more computer-readable instructions, when executed by the one or more processors, further cause the server system to:
in a case where the first identification information for identifying the first apparatus and second identification information for identifying a second apparatus different from the first apparatus are inputted to the first terminal device, receive the second identification information from the first terminal device,
wherein in a case where the first identification information and the second identification information are received from the first terminal device, one URL is generated as the first URL, the one URL including the first related information related to the first identification information and second related information related to the second identification information, and
the message includes the one URL, which is the first URL, including the first related information and the second related information.

16. The non-transitory computer-readable medium as in claim 15, wherein the one or more computer-readable instructions, when executed by the one or more processors, further cause the server system to:
in a case where the first identification information and the second identification information are received from the first terminal device,
obtain first model information related to a model of the first apparatus based on the first identification information; and
obtain second model information related to a model of the second apparatus based on the second identification information,
wherein in a case where the first model information is identical to the second model information, the one URL is generated as the first URL, the one URL including the first related information and the second related information; and the message includes the one URL, which is the first URL, including the first related information and the second related information, wherein in a case where the first model information is not identical to the second model information, the first URL including the first related information and not including the second related information is generated, wherein the one or more computer-readable instructions, when executed by the one or more processors, further cause the server system to:

in the case where the first model information is not identical to the second model information, generate a second URL indicating a location in the server system and including the second related information related to the second identification information, and wherein in the case where the first model information is not identical to the second model information, the message includes the first URL and the second URL.

17. The non-transitory computer-readable medium as in claim 10, wherein the one or more computer-readable instructions, when executed by the one or more processors, further cause the server system to:

receive, from the first apparatus, status information indicating a usage status of a consumable article currently being used in the first apparatus after the service information has been registered in the server system; and execute, based on the received status information, a service process for providing the specific service of shipping a consumable article for use in the first apparatus.

18. A method performed by a server system, the method comprising:

in a case where first identification information and destination information are inputted to a first terminal device, receiving the inputted first identification information and the inputted destination information from the first terminal device, the first identification information identifying a first apparatus, and the destination information indicating a destination of a message to a user of a second terminal device which is different from the first terminal device;

in a case where the first identification information and the destination information are received from the first terminal device, generating a first Uniform Resource Locator (URL) indicating a location in the server system, the first URL including first related information related to the first identification information;

sending the message including the generated first URL to the second terminal device based on the destination information;

in a case where a selection instruction of selecting the first URL included in the message displayed on the second terminal device is inputted to the second terminal device, receiving the first related information included in the first URL from the second terminal device; and in a case where the first related information is received from the second terminal device, sending screen information to the second terminal device, the screen information representing a registration screen related to a process for registering service information in the server system, the service information including information for a user of the first apparatus identified by the first identification information related to the first related information to receive provision of a specific service from the server system.

19. The server system as in claim 1, wherein
the destination information is an e-mail address,
the message is included in an e-mail,
the e-mail is sent to the second terminal device based on the e-mail address.

20. The non-transitory computer-readable medium as in claim 10, wherein
the destination information is an e-mail address,
the message is included in an e-mail,
the e-mail is sent to the second terminal device based on the e-mail address.

* * * * *

UNITED STATES PATENT AND TRADEMARK OFFICE
CERTIFICATE OF CORRECTION

| | |
|---|---|
| PATENT NO. | : 10,785,379 B2 |
| APPLICATION NO. | : 16/261809 |
| DATED | : September 22, 2020 |
| INVENTOR(S) | : Takeshi Nagasaki |

It is certified that error appears in the above-identified patent and that said Letters Patent is hereby corrected as shown below:

In the Claims

Column 16, Claim 6, Line 8:
Please delete "information and" and insert --information, and--

Column 18, Claim 14, Line 26:
Please delete "information and" and insert --information, and--

Signed and Sealed this
Third Day of May, 2022

Katherine Kelly Vidal
*Director of the United States Patent and Trademark Office*